United States Patent

Bodtker

[11] Patent Number: 5,915,875
[45] Date of Patent: Jun. 29, 1999

[54] END PLAY TAKE UP RETAINING RING

[75] Inventor: Joen Christen Bodtker, Flint, Mich.

[73] Assignee: General Motors Corporation, Detroit, Mich.

[21] Appl. No.: 09/100,794

[22] Filed: Jun. 19, 1998

[51] Int. Cl.$^6$ .............................. B65G 3/00; F16B 21/18
[52] U.S. Cl. ........................ 403/319; 403/154; 411/517; 384/903
[58] Field of Search ................................. 403/154, 155, 403/319, 316; 411/516, 517, 518, 521, 528, 352, 353; 384/903

[56] References Cited

U.S. PATENT DOCUMENTS

| | | | |
|---|---|---|---|
| 3,389,923 | 6/1968 | Love | 411/517 |
| 3,564,975 | 2/1971 | Moran . | |
| 4,082,326 | 4/1978 | Bryson . | |
| 4,343,581 | 8/1982 | Millheiser | 411/517 |
| 4,350,398 | 9/1982 | Schulz et al. . | |
| 4,364,615 | 12/1982 | Euler . | |
| 4,607,539 | 8/1986 | Arima | 411/517 |
| 4,968,910 | 11/1990 | Meier et al. . | |
| 4,995,736 | 2/1991 | Haase et al. . | |
| 5,064,227 | 11/1991 | Spors et al. . | |
| 5,201,233 | 4/1993 | Skinner et al. . | |
| 5,496,142 | 3/1996 | Fodor et al. . | |

*Primary Examiner*—Flemming Saether
*Attorney, Agent, or Firm*—Dean L. Ellis

[57] ABSTRACT

An end play take up retaining ring between a support element and a retained element is constituted by a longitudinally split sleeve defining at a first end thereof a closed-biased C-shaped spring and at a second end thereof a larger open-biased C-shaped spring. The closed-biased C-shaped spring is expanded to fit the retaining ring over an external annular groove in the support element. At the same time, the open-biased C-shaped spring is squeezed to a smaller diameter. When the closed-biased C-shaped spring is released, it resiliently clamps the retaining ring in the annular groove. When the open-biased C-shaped spring is released, it resiliently expands and thrusts a beveled shoulder against the retained element. The beveled shoulder converts expansion of the open-biased C-shaped spring into relative lateral thrust which seats the first end of the retaining ring against an end wall of the annular groove and the retained element against a stop on the support element. Thrust by the retained element on the retaining ring closes the open-biased C-shaped spring to collapse the retaining ring to a cylinder which radially overlaps the annular groove to prevent dislodgment of the retained element from the support element and vice versa.

3 Claims, 3 Drawing Sheets

END PLAY TAKE UP RETAINING RING

TECHNICAL FIELD

This invention relates to a retaining ring.

BACKGROUND OF THE INVENTION

A typical "end play take up" is a flat, C-shaped spring wedged between an end wall of a groove in a support element and a side of a retained element. A lip of the retaining ring exposed outside of the annular groove prevents dislodgment of the retained element from the support element. The retaining ring has a beveled shoulder which cooperates with the end wall of the annular groove in thrusting the retaining ring laterally against the retained element and the retained element laterally against a stop on the support element in response to resilient radial flexure of the retaining ring in the annular groove. Such lateral thrust eliminates dimensional clearance or lash between the support element and the retained element which would otherwise manifest itself as relative linear translation therebetween. The beveled shoulder on the retaining ring, however, also cooperates with the end wall of the annular groove in the support element in converting linear thrust of the retained element against the retaining ring into reverse flexure of the retaining ring and potential release of the retaining ring from the annular groove in the support element. An end play take up retaining ring according to this invention is a novel alternative to such prior end play take up retaining rings.

SUMMARY OF THE INVENTION

This invention is a new and improved end play take up retaining ring between a support element and a retained element. The retaining ring is a longitudinally split sleeve defining at a first end thereof a closed-biased C-shaped spring and at second end thereof an open-biased C-shaped spring having a diameter larger than the diameter of the closed-biased C-shaped spring. The closed-biased C-shaped spring is expanded to fit the retaining ring over an external annular groove in the support element. At the same time, the open-biased C-shaped spring is squeezed to a smaller diameter. When the closed-biased C-shaped spring is released, it resiliently closes to clamp the retaining ring in the annular groove with the first end of the retaining ring facing an end wall of the annular groove. When the open-biased C-shaped spring is released, it resiliently expands and thrusts a beveled shoulder on the retaining ring against the retained element. The beveled shoulder converts expansion of the open-biased C-shaped spring into relative lateral thrust which seats the first end of the retaining ring against the facing end wall of the annular groove and the retained element against a stop on the support element. Thrust by the retained element on the retaining ring closes the open-biased C-shaped spring to collapse the retaining ring to a cylinder in the annular groove in the support element. The cylinder thus defined by the retaining ring radially overlaps the annular groove to prevent dislodgment of the retained element from the support element and vice versa.

DESCRIPTION OF THE PREFERRED EMBODIMENT

Figure 1:
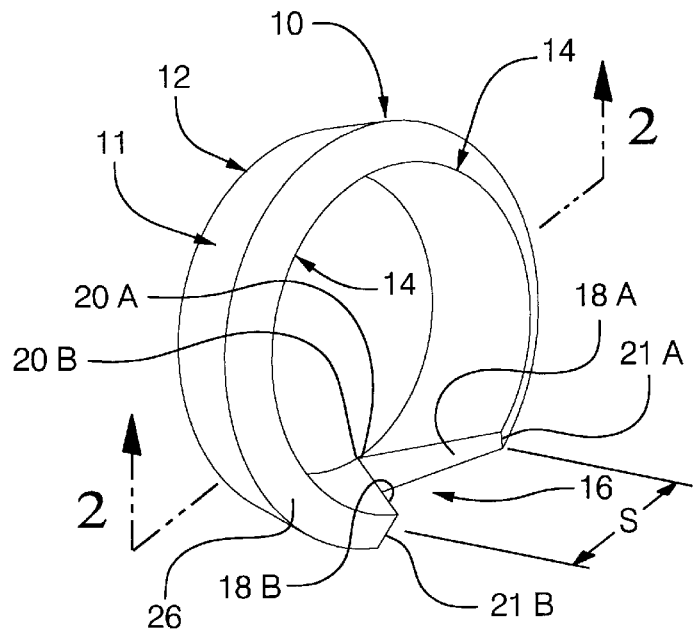
FIG. 1 is a perspective view of an end play take up retaining ring according to this invention.
Figure 2:
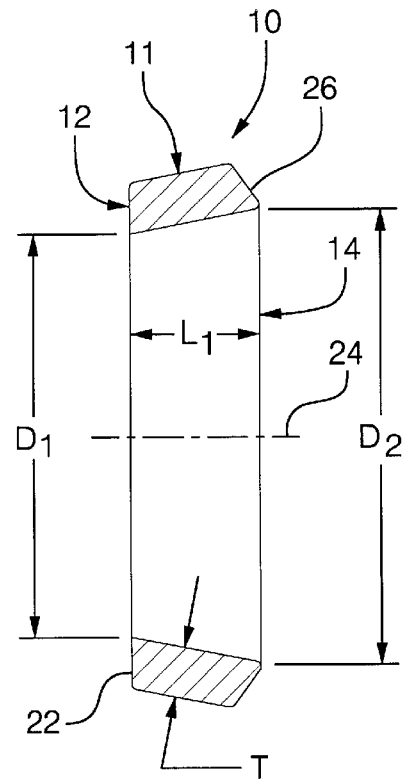
FIG. 2 is a sectional view taken generally along the plane indicated by lines 2—2 in FIG. 1.

Referring to FIGS. 1–2, an end play take-up retaining ring 10 according to this invention consists of a sleeve 11 having a wall thickness "T" and a length "$L_1$" between a first end 12 and a second end 14 of the retaining ring. The retaining ring is split in the length direction by a V-shaped notch 16 between a pair of edges 18A, 18B of the retaining ring which diverge from an apex at the first end 12 of the retaining ring. The retaining ring has a pair of corners 20A, 20B where the edges 18A, 18B intersect the first end of the retaining ring. The retaining ring has another pair of corners 21A, 21B where the edges 18A, 18B intersect the second end 14 of the retaining ring.

An annular flat seat 22 at the first end 12 of the retaining ring is interrupted or split by the apex of the V-shaped notch 16 and has a "C" shape between the corners 20A, 20B in a plane perpendicular to a longitudinal centerline 24 of the retaining ring. The annular flat seat 22 has an inside diameter "$D_1$". The second end 14 of the retaining ring is interrupted by the wide end of the V-shaped notch 16 and has a "C" shape between the corners 21A, 21B in a plane perpendicular to the longitudinal centerline 24. The second end 14 of the retaining ring has an inside diameter "$D_2$" greater than the inside diameter $D_1$ of the seat 22. The retaining ring has an outward facing or convex bevel shoulder 26 at the second end 14 thereof between the corners 21A, 21B.

The retaining ring is formed such that corners 20A, 20B at the first end 12 thereof are naturally biased against each other so that the first end of the retaining ring defines a closed-biased C-shaped spring. That is, when the retaining ring is resiliently flexed by spreading the corners 20A, 20B apart, a progressively increasing restoring force develops in the retaining ring which closes the corners against each other when the spreading force ceases. The retaining ring is also formed such that corners 21A, 21B at the second end 14 of the retaining ring are naturally biased apart to a span dimension "S", FIG. 1, so that the second end of the retaining ring defines an open-biased C-shaped spring. That is, when the retaining ring is resiliently flexed by squeezing the corners 21A, 21B together, an increasing restoring force develops in the retaining ring which radially expands the second end 14 of the retaining ring and spreads apart the corners 21A, 21B to restore the span dimension S and the inside diameter $D_2$. Importantly, when the corners 21A, 21B are squeezed into butting engagement, the retaining ring assumes the shape of a cylinder, not shown, having an inside diameter equal to diameter $D_1$.

FIGS. 3–6 illustrate the retaining ring 10 according to this invention in the environment of a motor vehicle power steering gear 28 such as more fully described in U.S. Pat. No. 3,022,772, issued Feb. 27, 1962 and assigned to the assignee of this invention, the disclosure of which is incorporated herein by reference. The steering gear 28 includes a structural housing 30 having a bore 32 therein and a rack piston 34 supported in the bore for back and forth linear translation in the direction of a longitudinal centerline 36 of the steering gear. A plurality of gear teeth 38 on the rack piston mesh with a plurality of gear teeth 40 on a sector of a pitman shaft 42 rotatably supported on the housing 30. The pitman shaft is linked to a pair of steerable dirigible wheels, not shown, of the motor vehicle.

An end 44 of the bore 32 is closed by a valve housing 46 bolted to the structural housing 30. A flat, disc-shaped partition 48 is rigidly clamped against a shoulder 50 on the structural housing by the valve housing. A first working chamber 52 of a steering assist fluid motor is defined between a closed end of the bore 32 and a first end 54 of the rack piston. A second working chamber 56 of the steering assist fluid motor is defined in the bore 32 between the partition 48 and a second end 58 of the rack piston.

A tubular stub shaft 60 is supported on valve housing 46 for rotation about the longitudinal centerline 36 of the steering gear. The stub shaft is connected to a steering hand wheel, not shown, of the motor vehicle for unitary rotation therewith. A fragmentarily illustrated rotary control valve 62 in a valve bore 64 in the valve housing includes a tubular valve body 66 rotatably supported on the stub shaft and a valve spool 68 defined by the portion of the stub shaft surrounded by the valve body. As fully described in the aforesaid U.S. Pat. No. 3,022,772, the rotary control valve connects either one of the fluid motor working chambers 52,56 to a high pressure port 70 on the valve housing and the other to a low pressure port 72 on the valve housing in response to relative rotation between the valve body and the valve spool.

A worm shaft 74 of the power steering gear 28 has an elongated shank 76 protruding through an aperture 78 in the partition 48 and an integral annular boss 80 between the rotary control valve 62 and the partition. The annular boss 80 has a cylindrical outer surface 82 cooperating with the valve bore 64 in supporting the worm shaft on the valve housing for rotation about the longitudinal centerline 36 of the steering gear. A radial pin 84 couples the valve body 66 to the worm shaft for rotation as a unit therewith. A torsion bar 86 inside of the stub shaft 60 is rigidly connected at one end to the stub shaft and at the other end to the worm shaft. Torque applied manually at the steering hand wheel is transferred from the stub shaft to the worm shaft through the torsion bar.

The shank 76 of the worm shaft has an external spiral groove 88 thereon facing an internal spiral groove 90 in a capped bore in the rack piston. A plurality of steel spheres 92 are interposed between the spiral grooves 88,90 and cooperate therewith in defining a conventional recirculating ball screw between the worm shaft and the rack piston which converts rotation of the worm shaft into back and forth linear translation of the rack piston.

Figure 3:
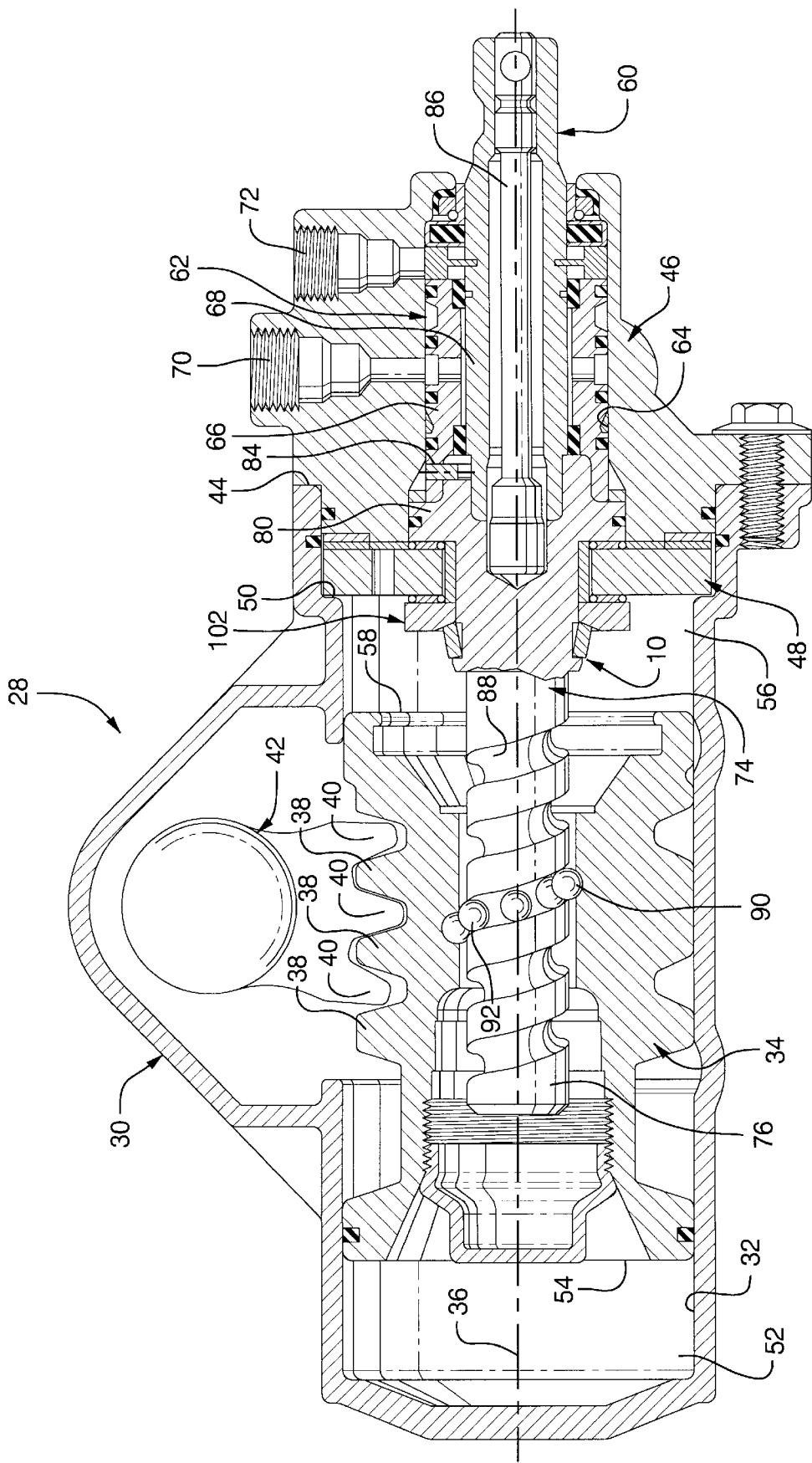
FIG. 3 is a longitudinal sectional view of a motor vehicle power steering gear having therein an end play take up retaining ring according to this invention.
Figure 4:
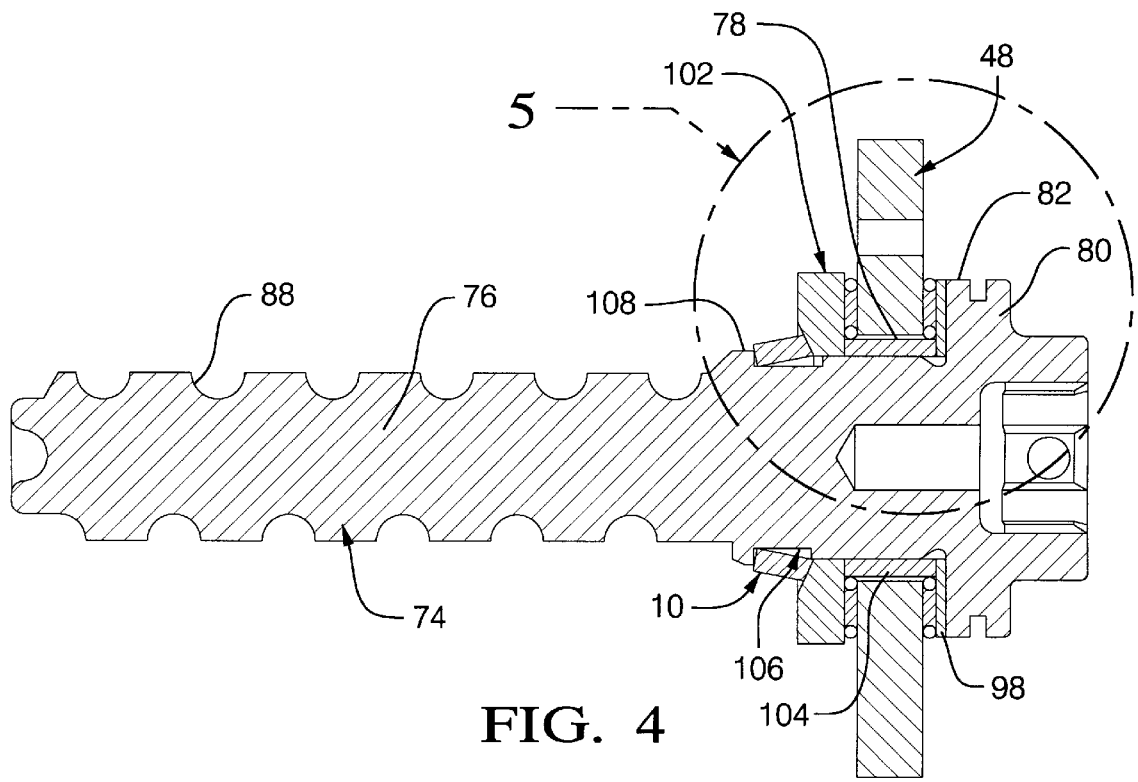
FIG. 4 is an enlarged view of a portion of FIG. 3.
Figure 5:
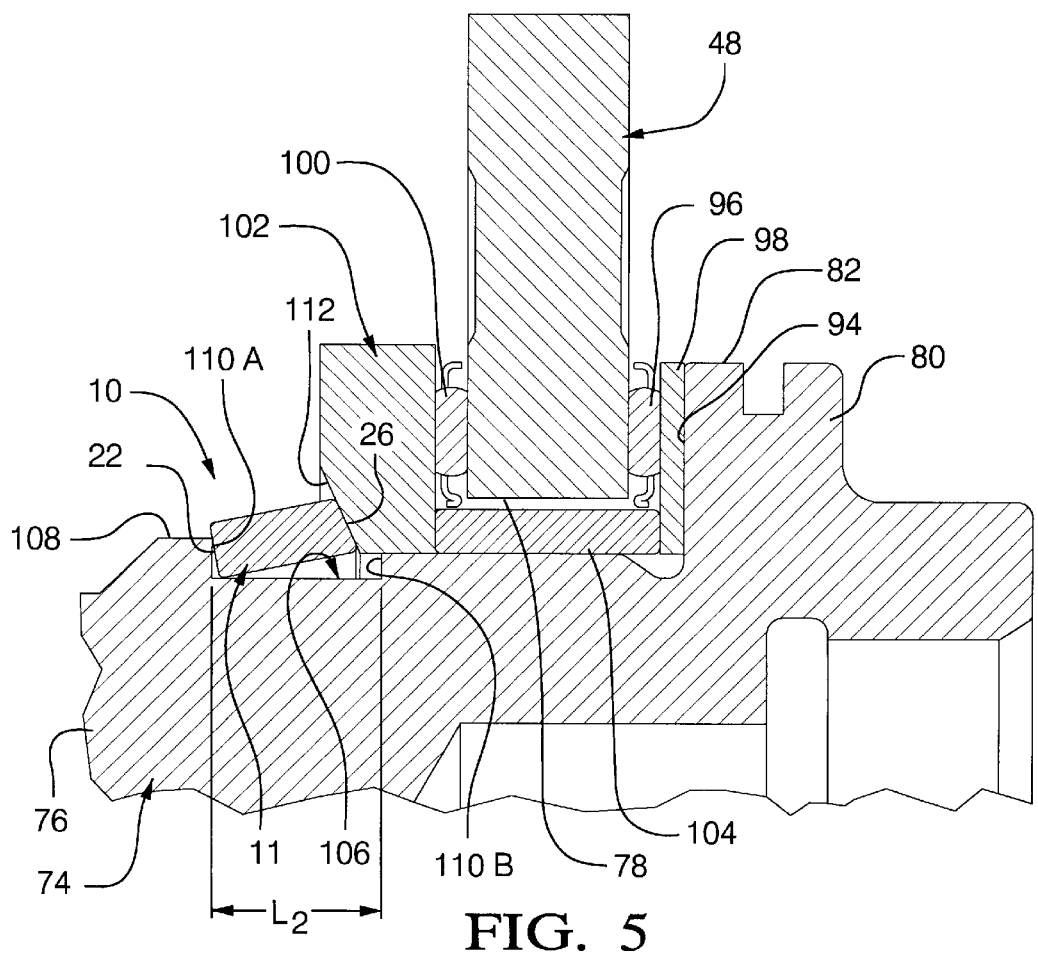
FIG 5. is an enlarged view of the portion of FIG. 4 identified by reference circle 5 in FIG. 4.

As seen best in FIGS. 3–5, the annular boss 80 on the worm shaft has a shoulder 94 perpendicular to the longitudinal centerline 36 of the steering gear facing the partition 48. A first roller thrust bearing 96 is disposed between the partition and an annular first thrust washer 98 seated against the shoulder 94 of the boss 80. A second roller thrust bearing 100 is disposed between the partition 48 and an annular second thrust washer 102 around the worm shaft. A tubular spacer 104 around the shank of the worm shaft in the aperture 78 in the partition seats at opposite ends against the thrust washers 98,102.

An external annular groove 106 in an outside cylindrical surface 108 of the worm shaft overlaps the second trust washer 102 and has a length dimension "$L_2$", FIG. 5, between a pair of end walls 110A, 110B of the annular groove. Length dimension $L_2$ of the annular groove exceeds the length dimension $L_1$ of the retaining ring. A radial depth dimension "$D_3$", FIG. 6, of the annular groove 106 is less than the thickness dimension T of the retaining ring. A concave, i.e. inward facing, bevel shoulder 112 on the second thrust washer 102 surrounds the hole in the middle of the thrust washer around the worm shaft.

Figure 6:
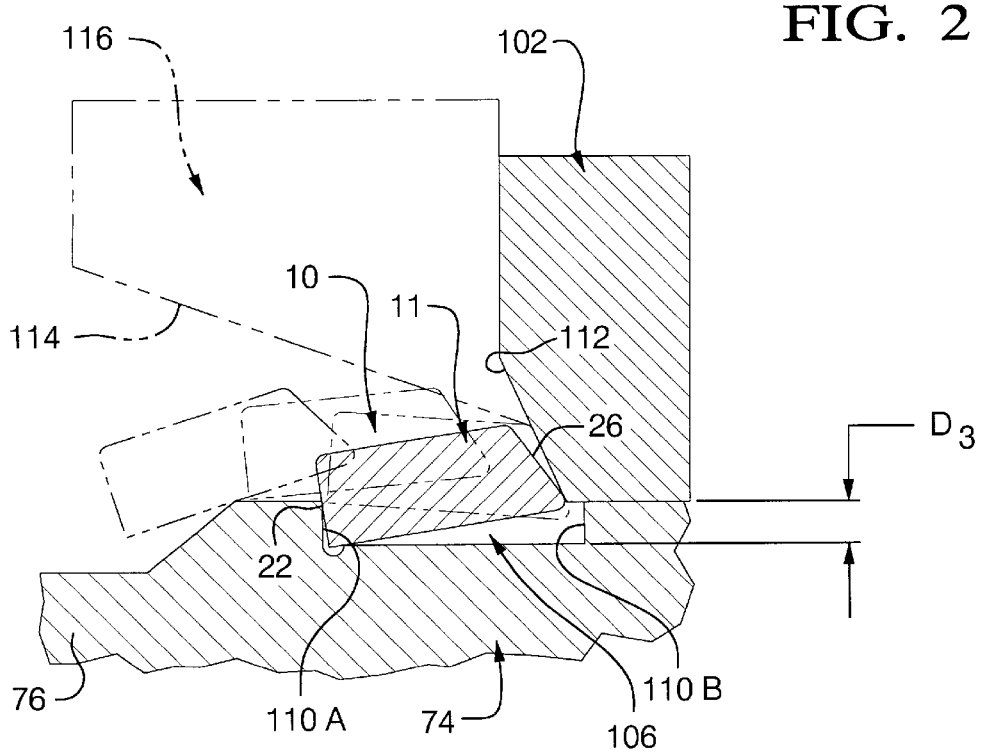
FIG. 6 is an enlarged view of a portion of FIG. 5 illustrating installation of the end play take up retaining ring according to this invention between a worm shaft and a thrust washer of the motor vehicle power steering gear illustrated in FIG. 3.

As illustrated in FIG. 6, the retaining ring 10 is installed in the external annular groove 106 by resiliently opening the aforesaid closed-biased, C-shaped spring defined at the first end 12 of the retaining ring while at the same time resiliently closing the aforesaid open-biased, C-shaped spring at the second end 14 of the retaining ring. That is, the corners 20A, 20B are spread apart to expand the inside diameter $D_1$ of the seat 22 beyond the diameter of the cylindrical surface 108 of the worm shaft and the retaining ring is advanced over the shank of the worm shaft toward the external annular groove 106. At the same time, an inside cone-shaped surface 114 of a schematically represented funnel tool 116 around the retaining ring engages the retaining ring around the convex bevel shoulder 26 and converts linear translation of the retaining ring into radial thrust which squeezes the corners 21A, 21B toward each other to reduce the span dimension S and the diameter $D_2$ of the second end 14 of the retaining ring.

The length $L_2$ of the annular groove 106 and the length $L_1$ of the retaining ring are calculated to fit the convex bevel shoulder 26 under the concave bevel shoulder 112 when the retaining ring is between the end walls 110A, 110B of the annular groove. When the corners 20A, 20B are released, the closed-biased C-shaped spring at the first end 12 of the retaining ring snaps closed in the annular groove 106 with the seat 22 on the retaining ring facing the end wall 110A of the annular groove. Conversely, when the funnel tool 116 is removed and the corners 21A, 21B released, the second end 14 of the retaining ring resiliently expands and thrusts the convex bevel shoulder 26 radially against the concave bevel shoulder 112 on the retained element constituted by the second thrust washer 102.

The convex and concave bevel shoulders 26,112 constitute a cam means operative to convert radial thrust of the retaining ring into lateral thrust in the direction of the longitudinal centerline 36 of the steering gear which wedges the retaining ring between the end wall 110A of the annular groove 106 and the second thrust washer 102. Such lateral thrust resiliently preloads the first and the second thrust washers 98,102 and the tubular spacer 104 against a stop on the worm shaft constituted by the shoulder 94 with zero dimensional clearance or lash therebetween which would otherwise manifest itself as relative linear translation between the thrust washers, the tubular spacer, and the worm shaft. It will be apparent that the aforesaid cam means could be constituted by the convex bevel shoulder alone in engagement on the circular edge of the hole in the second thrust washer around the worm shaft.

During operation of the power steering gear 28, manual effort applied at the steering hand wheel of the motor vehicle is transferred from the stub shaft 60 to the worm shaft 74 through the torsion bar 86. The stub shaft rotates relative to the worm shaft against a restoring force of the torsion bar because the pitman shaft 42 linked to the steerable dirigible wheels initially resists linear translation of the rack piston 34. Corresponding relative rotation between the valve spool 68 and the valve body 66 causes the control valve 62 to connect one of the working chambers 52,56 to the high pressure port 70 while connecting the other of the working chambers to the low pressure port 72. The corresponding fluid pressure gradient across the rack piston supplements the thrust applied thereto through the recirculating ball screw to induce linear translation of the rack piston and rotation of the pitman shaft.

Leftward thrust, FIG. 1, on the worm shaft attributable to steering in one direction reacts to the structural housing 30 through the boss 80 on the worm shaft, the first thrust washer 98, the first roller thrust bearing 96, and the partition 48. Rightward thrust on the worm shaft attributable to steering in the opposite direction reacts to the structural housing 30 through the retaining ring 10, the second thrust washer 102, the second roller thrust bearing 100, the partition 48, and the valve housing 46.

Importantly, in the event that such rightward thrust attains an extraordinary magnitude, the convex and concave bevel shoulders 26,112 cooperate in converting the corresponding lateral thrust of the second thrust washer against the retaining ring into radial thrust on the retaining ring perpendicular to the longitudinal centerline 36 of the steering gear. Such radial thrust squeezes together the corners 21A, 21B of the second end 14 of the retaining ring until, ultimately, the retaining ring assumes the shape of the aforesaid cylinder in the annular groove 106. Even in that circumstance, however, because the radial depth $D_3$ of the annular groove is less than the wall thickness dimension T of the retaining ring, a fraction of the retaining ring remains exposed outside of the annular groove to continue to positively prevent dislodgment of the worm shaft from the partition 48.

Having thus described the invention, what is claimed is:

1. In combination with a support element having an annular groove therein and a stop thereon and a retained element adjacent to said stop, a retaining ring comprising:

a tubular sleeve having an annular first end and an annular second end larger than said annular first end and a V-shaped notch between a pair of diverging longitudinal edges of said retaining ring, and a cam means on said retaining ring, said V-shaped notch at an apex thereof interrupting said annular first end and defining a pair of corners of said annular first end biased against each other so that said annular first end constitutes a closed-biased C-shaped spring of said retaining ring, said V-shaped notch at a wide end thereof interrupting said annular second end and defining a pair of corners of said annular second end biased apart to a predetermined span dimension so that said annular second end constitutes an open-biased C-shaped spring of said retaining ring, said closed-biased C-shaped spring being resiliently expanded around said annular groove and released to resiliently clamp said retaining ring to said support element in said annular groove with said annular first end of said retaining ring facing an end wall of said annular groove, said open-biased C-shaped spring being concurrently resiliently closed to fit said second end of said retaining ring under a shoulder on said retained element and released to expand said second end of said retaining ring, and said cam means being operative to convert expansion of said second end of said retaining ring into lateral thrust between said retaining ring and said retained element to seat said retained element against said stop on said support element and said annular first end of said retaining ring against said facing end wall of said annular groove.

2. The retaining ring recited in claim 1 wherein said cam means comprises:

a convex bevel shoulder on said retaining ring engageable on said retained element.

3. The retaining ring recited in claim 2 wherein said cam means further comprises:

a concave bevel shoulder on said retained element cooperating with said convex bevel shoulder on said retaining ring in converting expansion of said second end of said retaining ring into lateral thrust between said retaining ring and said retained element.

* * * * *